United States Patent
Nilsson et al.

(10) Patent No.: US 10,993,122 B2
(45) Date of Patent: Apr. 27, 2021

(54) BEAM MANAGEMENT PROCEDURE IN A COMMUNICATIONS NETWORK

(71) Applicant: Telefonaktiebolaget LM Ericsson (publ), Stockholm (SE)

(72) Inventors: Andreas Nilsson, Gothenburg (SE); Fredrik Athley, Kullavik (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 141 days.

(21) Appl. No.: 15/761,655

(22) PCT Filed: Mar. 2, 2018

(86) PCT No.: PCT/EP2018/055153
§ 371 (c)(1),
(2) Date: Mar. 20, 2018

(87) PCT Pub. No.: WO2019/166100
PCT Pub. Date: Sep. 6, 2019

(65) Prior Publication Data
US 2019/0387417 A1    Dec. 19, 2019

(51) Int. Cl.
*H04W 16/28* (2009.01)
*H04B 7/10* (2017.01)

(52) U.S. Cl.
CPC .................... *H04W 16/28* (2013.01)

(58) Field of Classification Search
CPC .. H04B 7/10; H04B 7/06; H04B 7/08; H04W 16/28
See application file for complete search history.

(56) References Cited

U.S. PATENT DOCUMENTS

| | | | | |
|---|---|---|---|---|
| 2004/0095907 | A1* | 5/2004 | Agee | H04B 7/0417 370/334 |
| 2015/0341200 | A1* | 11/2015 | bin Mohd Yussof | H04L 27/2628 370/204 |
| 2016/0308637 | A1* | 10/2016 | Frenne | H04J 11/0069 |
| 2017/0338874 | A1* | 11/2017 | Pratt | H04B 7/0617 |
| 2018/0219601 | A1* | 8/2018 | Davydov | H04L 5/0048 |
| 2019/0082330 | A1* | 3/2019 | Guey | H04L 5/0048 |

(Continued)

FOREIGN PATENT DOCUMENTS

WO    WO-2019061253 A1 * 4/2019 ........... H04B 17/318

OTHER PUBLICATIONS

NPL-1 R1-1710401,Vivo,On CSI-RS design for beam management, Jun. 2017 (Year: 2017).*

(Continued)

*Primary Examiner* — Dong-Chang Shiue
(74) *Attorney, Agent, or Firm* — Sage Patent Group (57) ABSTRACT

There is provided mechanisms for a beam management procedure in a communications network. A method is performed by a first radio transceiver device. The method comprises transmitting, in at least one directional transmit beam, a reference signal to a second radio transceiver device as part of the beam management procedure. More than one occurrence of the reference signal is transmitted within one single OFDM symbol. One occurrence for each of two polarizations of the reference signal is transmitted in each of the at least one directional transmit beam within the one single OFDM symbol.

24 Claims, 5 Drawing Sheets

(56) References Cited

U.S. PATENT DOCUMENTS

2020/0014454 A1\* 1/2020 Guo ..................... H04B 7/0695
2020/0067674 A1\* 2/2020 Guan ................... H04L 5/0044

OTHER PUBLICATIONS

NPL-2 Spreadtrum,On CSI-RS design for beam management,May 2017 (Year: 2017).\*
Transmittal of International Search Report and Written Opinion of the International Searching Authority, International Search Report, and Written Opinion of the International Searching Authority, PCT/EP2018/055153, dated Nov. 16, 2018, 28 pages.
Vivo, "On CSI-RS design for beam management", 3GPP Draft; R1-1710401, 3GPP TSG RAN WG1 Meeting NR Ad-Hoc#2, Qingdao, P. R. China, Jun. 27-30, 2017 XP051299613, 5 pages.
Spreadtrum Communications, R1-1707783, "On CSI-RS using sub-time unit in beam management", 3GPP TSG RAN WG1 meeting #89, Hangzhou, China May 15-19, 2017 XP051272986, 8 pages.
Tateishi, K., et al., "Indoor Experiment on 5G Radio Access Using Beam Tracking at 15 GHz Band," 2016 IEEE $27^{th}$ Annual International Symposium on Personal, Indoor, and Mobile Radio Communications (PIMRC); Workshop Inclusive Radio Communications Networks for 5G and Beyond (IRACON2016) 6 pages.

\* cited by examiner

BEAM MANAGEMENT PROCEDURE IN A COMMUNICATIONS NETWORK

CROSS REFERENCE TO RELATED APPLICATIONS

This application is a 35 U.S.C. § 371 national stage application of PCT International Application No. PCT/EP2018/055153 filed on Mar. 2, 2018, the disclosure and content of which is incorporated by reference herein in its entirety.

TECHNICAL FIELD

Embodiments presented herein relate to a method, a first radio transceiver device, a computer program, and a computer program product for a beam management procedure in a communications network. Embodiments presented herein further relate to a method, a second radio transceiver device, a computer program, and a computer program product for participating in a beam management procedure in the communications network.

BACKGROUND

In communications networks, there may be a challenge to obtain good performance and capacity for a given communications protocol, its parameters and the physical environment in which the communications network is deployed.

For example, for future generations of mobile communications systems frequency bands at many different carrier frequencies could be needed. For example, low such frequency bands could be needed to achieve sufficient network coverage for terminal devices and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the network node at the network side and at the terminal devices at the user side might be required to reach a sufficient link budget.

In general terms, the use of beamforming could imply that the terminal devices will be not only operatively connected to the network node via a beam but also performs a handover between (narrow) beams instead of between network nodes of different cells. At higher frequency bands high-gain beamforming with narrow beams could be used due to more challenging radio propagation properties than at lower frequency bands. Each beam will only be optimal within a small area and the link budget outside the optimal beam will deteriorate quickly. Hence, frequent and fast beam switching is needed to maintain high performance. This is hereinafter referred to as beam management. One purpose of so-called beam management is thus for the network node to keep track of its served terminal devices with narrow beams (as used at the transmission and reception point (TRP) of the network node and/or the terminal devices) in order to increase coverage and throughput.

Due to the high penetration loss through objects and poor diffraction around object edges at higher frequency bands the link between the TRP and the terminal device will be sensitive to blocking. Blocking could occur either slowly/gradually or very suddenly, depending on the speed of movement of the terminal device, and the motion of objects in the environment. The narrower the beams, the more chance there is for sudden blocking to occur. Thus, due to rotation, movement and/or blockage of the served terminal devices the beam (at the TRP and/or terminal devices) needs to be updated dynamically in order to maintain good channel quality between the network node and the served terminal devices.

In case an operative connection between a served terminal device and the network node is lost, for example due to radio propagation channel deterioration such as blocking, a beam recovery procedure can be initiated to re-establish the beam connection. Such a beam recovery procedure could, for example, involve beam training whereby all different combinations of beams, both at the network node and at the terminal device, are swept through. Beam training could thus be part of beam management. When there are many candidate beams such beam training could be costly in terms of time consumption and overhead signaling.

This could be especially challenging where the terminal device is configured for analog beamforming and thus only can sweep through its candidate beams sequentially one at a time.

In order to find a suitable TRP beam the TRP transmits reference signals, such as channel state information reference signals (CSI-RS) in different directional transmit beams on which the terminal device performs measurements, such as of reference signal received power (RSRP), and reports back the N best directional transmit beams (where N can be configured by the network). Different directional transmit beams are typically transmitted in different reference signal resources (i.e. one directional transmit beam corresponds to one reference signal resource), and the terminal device then typically reports back N reference signal resource indicators (CRIs) to inform the TRP which directional transmit beams that gave the largest measured received power. Furthermore, the transmission of the reference signal on a given directional transmit beam can be repeated to allow the terminal device to evaluate suitable directional receive beams.

It is also possible to perform beam management involving a combined directional transmit beam sweep and directional receive beam sweep in order to find the best combination of directional transmit beam and directional receive beam. This is done by letting the TRP repeatedly transmit the reference signal in each directional transmit beam, and do this for a number of different directional transmit beams. The terminal device will then report back the best directional transmit beam and remember the best directional receive beam for that directional transmit beam. The combined directional transmit beam sweep and directional receive beam sweep will thus give the optimal beam pair at the TRP and terminal device (due to all different combinations of beams being evaluated), but it also requires much overhead. For example if the TRP would like to evaluate 8 directional transmit beams and the terminal device would like to evaluate 4 directional receive beams, 32 different beam combinations has to be evaluated, which requires 32 occurrences of the reference signal to be transmitted.

Hence, there is still a need for an improved beam management.

SUMMARY

An object of embodiments herein is to provide efficient beam management where the above noted issues are resolved, or at least mitigated or reduced.

According to a first aspect there is presented a method for a beam management procedure in a communications network. The method is performed by a first radio transceiver device. The method comprises transmitting, in at least one directional transmit beam, a reference signal to a second radio transceiver device as part of the beam management procedure. More than one occurrence of the reference signal is transmitted within one single OFDM symbol. One occurrence for each of two polarizations of the reference signal is transmitted in each of the at least one directional transmit beam within the one single OFDM symbol.

According to a second aspect there is presented a first radio transceiver device for a beam management procedure in a communications network. The first radio transceiver device comprises processing circuitry. The processing circuitry being configured to cause the first radio transceiver device to transmit, in at least one directional transmit beam, a reference signal to a second radio transceiver device as part of the beam management procedure. More than one occurrence of the reference signal is transmitted within one single OFDM symbol. One occurrence for each of two polarizations of the reference signal is transmitted in each of the at least one directional transmit beam within the one single OFDM symbol.

According to a third aspect there is presented a first radio transceiver device for a beam management procedure in a communications network. The first radio transceiver device comprises a transmit module configured to transmit, in at least one directional transmit beam, a reference signal to a second radio transceiver device as part of the beam management procedure. More than one occurrence of the reference signal is transmitted within one single OFDM symbol. One occurrence for each of two polarizations of the reference signal is transmitted in each of the at least one directional transmit beam within the one single OFDM symbol.

According to a fourth aspect there is presented a computer program for a beam management procedure in a communications network. The computer program comprises computer program code which, when run on processing circuitry of a first radio transceiver device, causes the first radio transceiver device to perform a method according to the first aspect.

According to a fifth aspect there is presented a method for participating in a beam management procedure in a communications network. The method is performed by a second radio transceiver device. The method comprises receiving, in at least one receive beam, a reference signal from a first radio transceiver device as part of participating in the beam management procedure. The reference signal has been transmitted from the first radio transceiver device in at least one directional transmit beam. More than one occurrence of the reference signal is transmitted within one single OFDM symbol. One occurrence for each of two polarizations of the reference signal is transmitted in each of the at least one directional transmit beam within the one single OFDM symbol.

According to a sixth aspect there is presented a second radio transceiver device for participating in a beam management procedure in a communications network. The second radio transceiver device comprises processing circuitry. The processing circuitry being configured to cause the second radio transceiver device to receive, in at least one receive beam, a reference signal from a first radio transceiver device as part of participating in the beam management procedure. The reference signal has been transmitted from the first radio transceiver device in at least one directional transmit beam. More than one occurrence of the reference signal is transmitted within one single OFDM symbol. One occurrence for each of two polarizations of the reference signal is transmitted in each of the at least one directional transmit beam within the one single OFDM symbol.

According to a seventh aspect there is presented a second radio transceiver device for participating in a beam management procedure in a communications network. The second radio transceiver device comprises a receive module configured to receive, in at least one receive beam, a reference signal from a first radio transceiver device as part of participating in the beam management procedure. The reference signal has been transmitted from the first radio transceiver device in at least one directional transmit beam. More than one occurrence of the reference signal is transmitted within one single OFDM symbol. One occurrence for each of two polarizations of the reference signal is transmitted in each of the at least one directional transmit beam within the one single OFDM symbol.

According to an eight aspect there is presented a computer program for participating in a beam management procedure in a communications network, the computer program comprising computer program code which, when run on processing circuitry of a second radio transceiver device, causes the second radio transceiver device to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Advantageously these methods, these radio transceiver devices, and these computer programs enable efficient beam management where the above noted issues are resolved, or at least mitigated or reduced.

Advantageously, compared to using single polarized sub-time units for beam management, the herein disclosed methods, radio transceiver devices, and computer programs enable an increase in the network performance at a cost of slightly higher overhead signaling.

Advantageously, compared to using 2-port reference signals for beam management that probes both polarization, the herein disclosed methods, radio transceiver devices, and computer programs enable a reduction in overhead signaling.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
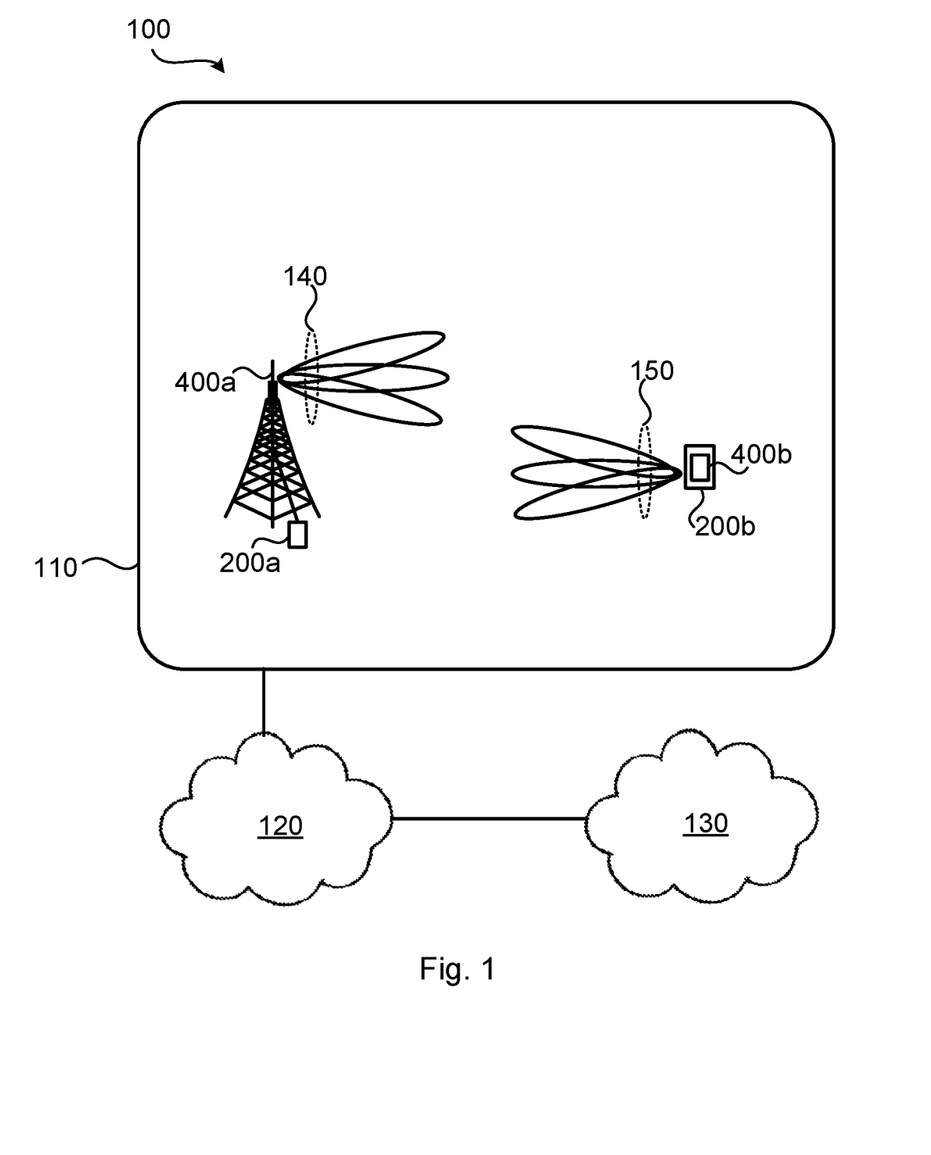
FIG. 1 is a schematic diagram illustrating a communications network according to embodiments.

FIG. 1 is a schematic diagram illustrating a communications network 100 where embodiments presented herein can be applied. The communications network 100 could be a third generation (3G) telecommunications network, a fourth generation (4G) telecommunications network, or a fifth (5G) telecommunications network and support any 3GPP telecommunications standard, where applicable.

The communications network 100 comprises a radio transceiver device 200a (hereinafter denoted first radio transceiver device) configured to, via TRP 400a, provide network access to a radio transceiver device 200b (hereinafter denoted second radio transceiver device), comprising TRP 400b, in a radio access network 110. In some embodiments radio transceiver device 200b is part of, integrated with, or collocated with, a terminal device and radio transceiver device 200a is part of, integrated with, or collocated with, a network node.

Radio access network 110 is operatively connected to a core network 120. The core network 120 is in turn operatively connected to a service network 130, such as the Internet. Radio transceiver device 200b is thereby, via the TRP 400a and radio transceiver device 200a, enabled to access services of, and exchange data with, the service network 130.

Examples of network nodes are radio access network nodes, radio base stations, base transceiver stations, Node Bs, evolved Node Bs, g Node Bs, access points, access nodes, and backhaul nodes. Examples of terminal devices are wireless devices, mobile stations, mobile phones, handsets, wireless local loop phones, user equipment (UE), smartphones, laptop computers, tablet computers, network equipped sensors, network equipped vehicles, and so-called Internet of Things devices.

The herein disclosed embodiments can be applied at first and second radio transceiver devices 200a, 200b implemented both a radio access network nodes and terminal devices, or even as radio transceiver devices implemented as backhauling nodes or a sidelink nodes. Thus, although radio transceiver device 200a in at least some of the herein disclosed embodiments is described as being a network node and radio transceiver device 200b is described as being a terminal device, the functionality of the herein disclosed radio transceiver device 200a could equally be implemented in a terminal device, and vice versa for radio transceiver device 200b.

Radio transceiver device 200b is, via TRP 400b, configured to communicate with radio transceiver device 200a in at least one beam 150. Further, radio transceiver device 200a is, via TRP 400a, configured to communicate with radio transceiver device 200b in at least one beam 140. Radio transceiver device 200b, 200a could be configured to communicate using a variety of beams having different shapes and widths, herein generally referred to as having different beam patterns.

As disclosed above a beam management procedure might be performed in order to determine which beams radio transceiver device 200a and radio transceiver device 200b should use. Issues with known beam management procedures have also been mentioned above.

Figure 2:
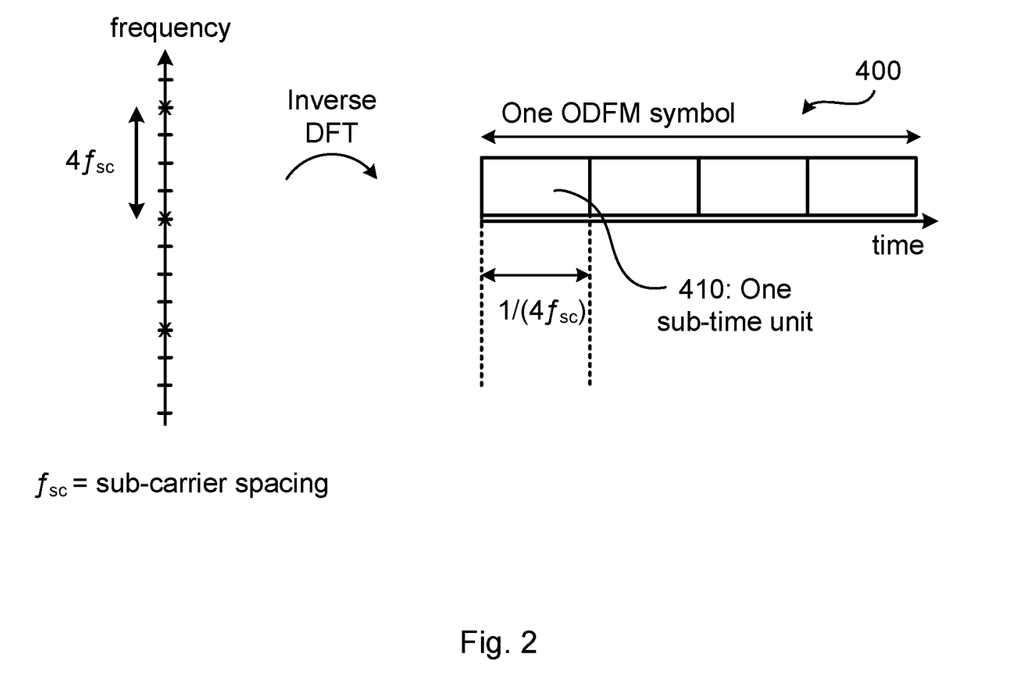
FIG. 2 schematically illustrates effects in time domain of sub-carrier spacing in frequency domain according to an embodiment.

One way to speed up a combined directional transmit beam sweep and directional receive beam sweep is to use so called sub-time units. Sub-time units means that the orthogonal frequency-division multiplexing (OFDM) symbol in which the reference signal is transmitted is divided in to shorter parts, where each part is identical. An OFDM symbol with n identical sub-time units can be generated by distributing a signal to every n-th sub-carrier, in a so called comb or interleaved frequency division multiple access (IFDMA) pattern. Transmitting on every n-th subcarrier means a zero insertion between every n-th sample in the frequency domain. By properties of the discrete Fourier transform (DFT), this implies an n-fold periodic repetition of the time domain signal. Hence, transmitting on every n-th subcarrier means that the resulting OFDM symbol will consist of n identical parts. FIG. 2 schematically illustrates how to generate an OFDM symbol 400 with n=4 identical parts (each part corresponding to one sub-time unit 410) by transmitting on every fourth sub-carrier.

However, in some communications systems there is, as of today, not any explicit support for the use of sub-time units 410 for beam management and hence there is, as of today, not any procedures specified that support sub-time unit beam management. However, as demonstrated with reference to FIG. 2, it is possible to create sub-time units 410 by transmitting reference signals from the first radio transceiver device 200a using a regular comb pattern in the frequency domain. This means that the second radio transceiver device 200b could perform a directional receive beam sweep within a single OFDM symbol 400, even though this is not explicitly supported today. A regular comb structure, resulting in sub-time units 410, is currently only supported for 1-port reference signals for beam management. Therefore, a 2-port reference signal for beam management cannot be used if sub-time units 410 are desired.

If the first radio transceiver device 200a, or its TRP 400a, has dual-polarized antennas it is possible to, without using sub-time units 410, configure each reference signal resource with two ports; one port per polarization. That is, where each directional transmit beam is transmitted over two polarizations. In this case the second radio transceiver device 200b, or its TRP 400b, could be configured to measure an average received power over both polarizations and report back the best directional transmit beam(s) based on the averaged received power.

Another alternative is that each reference signal resource is configured with only one port, which means that the reference signal is transmitted over only one single polarization. One advantage with using one-port reference signal resources compared to two-port reference signal resources for beam management is for example that the directional transmit beam sweeps can be performed twice as quick for radio transceiver devices, or TRPs, with analog beamforming for the antenna arrays. One reason for this is that then two directional transmit beams (one per polarization) pointing in different directions can be transmitted simultaneously. This means that half of the directional transmit beams can be evaluated for one polarization whilst the other half of the directional transmit beams are evaluated for the other polarization. Hence the beam sweeping will take half the time compared to two-port beam sweeping.

One drawback with single-port reference signal resources is that, due to that the reference signal is transmitted in one polarization only, there is not any information how good the radio propagation channel is in the other polarization. In case the received power should differ much between different polarizations, there is a risk that a sub-optimal directional transmit beam is selected by the terminal device if only one polarization is used for transmitting the reference signal; the use of different polarizations can result in different best directional beams being selected.

In view of the above, when using sub-time units 410 to speed up the beam management, they can, as of today, only be used for single port reference signals. This is turn implies that only one polarization will be evaluated which may lead to sub-optimal beam selection, thus resulting in performance reduction.

The embodiments disclosed herein therefore relate to mechanisms for a beam management procedure in the communications network 100 and for participating in a beam management procedure in the communications network 100. In order to obtain such mechanisms there is provided a first radio transceiver device 200a, a method performed by the first radio transceiver device 200a, a computer program product comprising code, for example in the form of a computer program, that when run on processing circuitry of the first radio transceiver device 200a, causes the first radio transceiver device 200a to perform the method. In order to obtain such mechanisms there is further provided a second radio transceiver device 200b, a method performed by the second radio transceiver device 200b, and a computer program product comprising code, for example in the form of a computer program, that when run on processing circuitry of the second radio transceiver device 200b, causes the second radio transceiver device 200b to perform the method.

Figure 3:
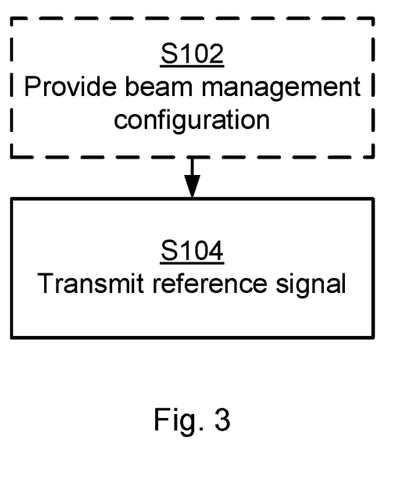
FIGS. 3 and 4 are flowcharts of methods according to embodiments.

Reference is now made to FIG. 3 illustrating a method for a beam management procedure in a communications network 100 as performed by the first radio transceiver device 200a according to an embodiment.

S104: The first radio transceiver device 200a transmits, in at least one directional transmit beam 140, a reference signal to the second radio transceiver device 200b as part of the beam management procedure.

The herein disclosed embodiments are based on that, when performing beam management using sub-time units 410 (i.e., where more than one occurrence of the reference signal is transmitted within one single OFDM symbol), the polarization of the directional transmit beam is switched between consecutive sub-time units 410.

Particularly, more than one occurrence of the reference signal is transmitted within one single OFDM symbol 400. One occurrence for each of two polarizations of the reference signal is transmitted in each of the at least one directional transmit beam 140 within the one single OFDM symbol 400.

This enables the second radio transceiver device 200b to measure the total power over both transmitted polarizations when it calculates the received power, leading to better beam selection compared to single-polarization measurements.

Embodiments relating to further details of a beam management procedure in a communications network 100 as performed by the first radio transceiver device 200a will now be disclosed.

In some aspects, which beam management procedure to be performed is specified in a beam management configuration. Hence, according to an o10 embodiment the beam management procedure is performed according to a beam management configuration.

There could be different beam management configurations.

A first beam management configuration specifies a pure transmit beam sweep (within one single OFDM symbol) and thus involves a beam sweep at the first radio transceiver device 200a but not any beam sweep at the second radio transceiver device 200b. Hence, according to an embodiment the beam management configuration specifies a beam sweep at the first radio transceiver device 200a and no beam sweep at the second radio transceiver device 200b.

For the pure transmit beam sweep, the first radio transceiver device 200a switches beams within the one single OFDM symbol 400. Particularly, according to an embodiment, within the one single OFDM symbol 400, one respective occurrence of the reference signal is transmitted in at least two directional transmit beams 140. Each of the at least two directional transmit beams 140 might then be transmitted in two polarizations within the one single OFDM symbol 400. The reference signal in each directional transmit beam 140 corresponds to one reference signal resource. For one and the same directional transmit beam 140 one occurrence of the same reference signal resource is thus transmitted in each polarization.

A second beam management configuration specifies a pure receive beam sweep (within one single OFDM symbol) and thus involves a beam sweep at the second radio transceiver device 200b but not any beam sweep at first radio transceiver device 200a. Hence, according to an embodiment the beam management configuration specifies no beam sweep at the first radio transceiver device 200a and a beam sweep at the second radio transceiver device 200b.

For the pure receive beam sweep, the first radio transceiver device 200a uses one and the same directional transmit beam for all occurrences of the reference signal within each OFDM symbols 400 but switches polarization within each OFDM symbol 400. Particularly, according to an embodiment, within the one single OFDM symbol 400, at least two occurrences of the reference signal are transmitted in each of two polarizations in one and the same directional transmit beam 140. How many times the first second radio transceiver device 200a switches polarization within the one single OFDM symbol 400 then depends on in how many directional receive beams 150 the reference signal is to be received by the second radio transceiver device 200b (and thus on how many sub-units the OFDM symbol 400 is divided into).

A third beam management configuration specifies a combined transmit beam sweep and receive beam sweep (within one single OFDM symbol) and thus involves a beam sweep at the first radio transceiver device 200a as well as a beam sweep at the second radio transceiver device 200b. Hence, according to an embodiment the beam management configuration specifies a beam sweep at the first radio transceiver device 200a and a beam sweep at the second radio transceiver device 200b.

For the combined transmit beam sweep and receive beam sweep, the first radio transceiver device 200a switches beam within the single OFDM symbol 400. Particularly, according to an embodiment, within the one single OFDM symbol 400, at least two occurrences of the reference signal are transmitted, wherein each of the at least two occurrences is transmitted in its own directional transmit beam 140.

In general terms, the examples of beam management configurations given above (and below) specify the beam management procedure to be used for one single OFDM symbol. Thus, it could be that the same or different beam management procedures are performed for adjacent OFDM symbols or in whatever OFDM symbols the beam management procedure is performed. For example, a beam management procedure according to the third beam management configuration could be performed in a first OFDM symbol and a beam management procedure according to the first beam management configuration could be performed in an OFDM symbol adjacent the first OFDM symbol (or in whatever OFDM symbol the next beam management procedure is to be performed).

There could be different ways for the radio transceiver devices 200a, 200b to know which beam management configuration is used for the beam management procedure. In some aspects which beam management configuration to use is hardcoded in the radio transceiver devices 200a, 200b or follows a predefined schedule. In other aspects the beam management configuration is communicated from the first radio transceiver device 200a to the second radio transceiver device 200b before the reference signal is transmitted. In general terms, it might thus be assumed that the radio transceiver devices 200a, 200b agree that the reference signal transmission shall be repeated in the same directional transmit beam 140 for the two polarizations. Particularly, according to an embodiment the first radio transceiver device 200a is configured to perform (optional) step S102:

S102: The first radio transceiver device 200a provides the beam management configuration to the second radio transceiver device 200b before transmitting the reference signal.

This can be achieved by the first radio transceiver device 200a signaling a one or more bit indicators (depending on how many beam management configurations there are to select from, and for how many consecutive beam management procedures the beam management configuration is valid; it could be that the beam management configuration is given as a pattern which specifies the beam management configuration for two or more consecutive beam management procedures). Since the beam management configuration might be rather static this signaling does not require any frequent signaling. Therefore, it induces only a negligible amount of signaling overhead.

There could be different ways for the first radio transceiver device 200a to switch polarization. In some aspects the first radio transceiver device 200a, or its TRP 400a, has one transmitter/receiver unit and one baseband chain for each polarization. There is then no need for any switching of analog components operating at radio frequency to achieve the polarization switching. The polarization switching can be achieved in baseband by changing which antenna port to transmit the reference signal on. Thus, in some aspects the polarization switching is accomplished by the first radio transceiver device 200a being configured to change antenna port at baseband. Particularly, according to an embodiment the first radio transceiver device 200a comprises baseband circuitry, and polarization is switched by changing antenna port at the baseband circuitry.

Figure 4:
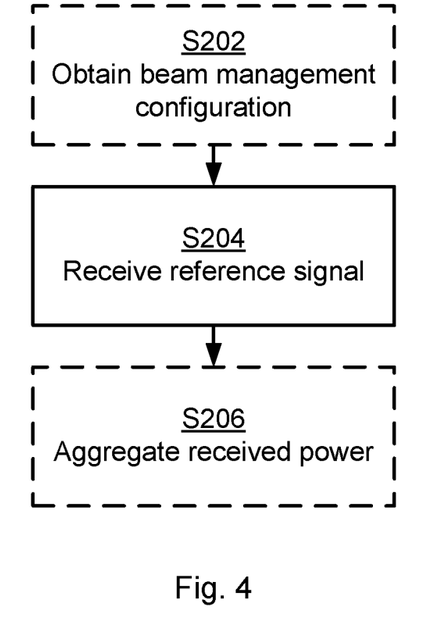

Reference is now made to FIG. 4 illustrating a method for participating in a beam management procedure in a communications network 100 as performed by the second radio transceiver device 200b according to an embodiment.

As disclosed above the first radio transceiver device 200a in step S104 transmits a reference signal. This reference signal is assumed to be received by the second radio transceiver device 200b. Hence, the second radio transceiver device 200b is configured to perform step S204:

S204: The second radio transceiver device 200b receives, in at least one receive beam 150, a reference signal from the first radio transceiver device 200a as part of participating in the beam management procedure.

As disclosed above, the reference signal has been transmitted from the first radio transceiver device 200a in at least one directional transmit beam 140. More than one occurrence of the reference signal is transmitted within one single OFDM symbol 400. One occurrence for each of two polarizations of the reference signal is transmitted in each of the at least one directional transmit beam 140 within the one single OFDM symbol 400.

Embodiments relating to further details of participating in a beam management procedure in a communications network 100 as performed by the second radio transceiver device 200b will now be disclosed.

Upon having received the reference signal in both polarizations for the same directional transmit beam 140 and the same receive beam 150, the second radio transceiver device 200b might aggregate the received power for the two polarizations. Hence, according to an embodiment the second radio transceiver device 200b is configured to perform (optional) step S206:

S206: The second radio transceiver device 200b aggregates, for each receive beam 150, received power for the occurrences of the reference signal transmitted for both the two polarizations in one of the at least one directional transmit beam 140.

There might be different beam configurations of receive beams 150 at the second radio transceiver device 200b. In some aspects the second radio transceiver device 200b receives the reference signal in only one receive beam. In this case the receive beam might be a comparatively broad beam. In other aspects the second radio transceiver device 200b receives the reference signal in two or more directional receive beams. In this case the directional receive beams might be comparatively narrow beams. Particularly, according to an embodiment the reference signal is received in at least two directional receive beams 150. One occurrence for each of two polarizations of the reference signal might then be received in each of the at least two directional receive beams 150. Further, the at least two directional receive beams 150 might be switched within the one single OFDM symbol 400 when the polarization in which the reference signal is transmitted is switched within the one single OFDM symbol 400

As disclosed above, in some aspects, which beam management procedure to be performed is specified in a beam management configuration.

As disclosed above, a first beam management configuration specifies a pure transmit beam sweep (within one single OFDM symbol) and thus involves a beam sweep at the first radio transceiver device 200a but not any beam sweep at the second radio transceiver device 200b. Hence, according to an embodiment the beam management configuration specifies a beam sweep at the first radio transceiver device 200a and no beam sweep at the second radio transceiver device 200b.

For the pure transmit beam sweep, the first radio transceiver device 200a switches beams within the one single OFDM symbol 400. Particularly, according to an embodiment, within the one single OFDM symbol 400, one respective occurrence of the reference signal as transmitted in at least two directional transmit beam 140 is received in one and the same receive beam 150. The reference signal as transmitted in each of the at least two directional transmit beam 140 might then have two polarizations within the one single OFDM symbol.

As disclosed above, a second beam management configuration specifies a pure receive beam sweep (within one single OFDM symbol) and thus involves a beam sweep at the second radio transceiver device 200b but not any beam sweep at first radio transceiver device 200a. Hence, according to an embodiment the beam management configuration specifies no beam sweep at the first radio transceiver device 200a and a beam sweep at the second radio transceiver device 200b.

For the pure receive beam sweep, the first radio transceiver device 200a uses one and the same directional transmit beam for all occurrences of the reference signal within each OFDM symbols 400 but switches polarization within each OFDM symbol 400. Particularly, according to an embodiment, within the one single OFDM symbol 400, at least two occurrences of the reference signal are transmitted in each of two polarizations in one and the same directional transmit beam 140, and the reference signal of both the two polarizations is received in each of at least two directional receive beams 150.

As disclosed above, a third beam management configuration specifies a combined transmit beam sweep and receive beam sweep (within one single OFDM symbol) and thus involves a beam sweep at the first radio transceiver device 200a as well as a beam sweep at the second radio transceiver device 200b. Hence, according to an embodiment the beam management configuration specifies a beam sweep at the first radio transceiver device 200a and a beam sweep at the second radio transceiver device 200b.

For the combined transmit beam sweep and receive beam sweep, the first radio transceiver device 200a switches beam within the single OFDM symbol 400. Particularly, according to an embodiment, within the one single OFDM symbol 400, at least two occurrences of the reference signal are transmitted, wherein each of the at least two occurrences is transmitted in its own directional transmit beam 140 and/or is received in each of at least two directional receive beams 150.

As disclosed above, there could be different ways for the radio transceiver devices 200a, 200b to know which beam management configuration is used for the beam management procedure. In some aspects which beam management configuration to use is hardcoded in the radio transceiver devices 200a, 200b or follows a predefined schedule. In other aspects the beam management configuration is communicated from the first radio transceiver device 200a to the second radio transceiver device 200b before the reference signal is transmitted. Particularly, according to an embodiment the second radio transceiver device 200b is configured to perform (optional) step S202:

S202: The second radio transceiver device 200b obtains the beam management configuration from the first radio transceiver device 200a before receiving the reference signal.

There could be different relations between the two polarizations. In some aspects the two polarizations are mutually orthogonal.

Figure 5:
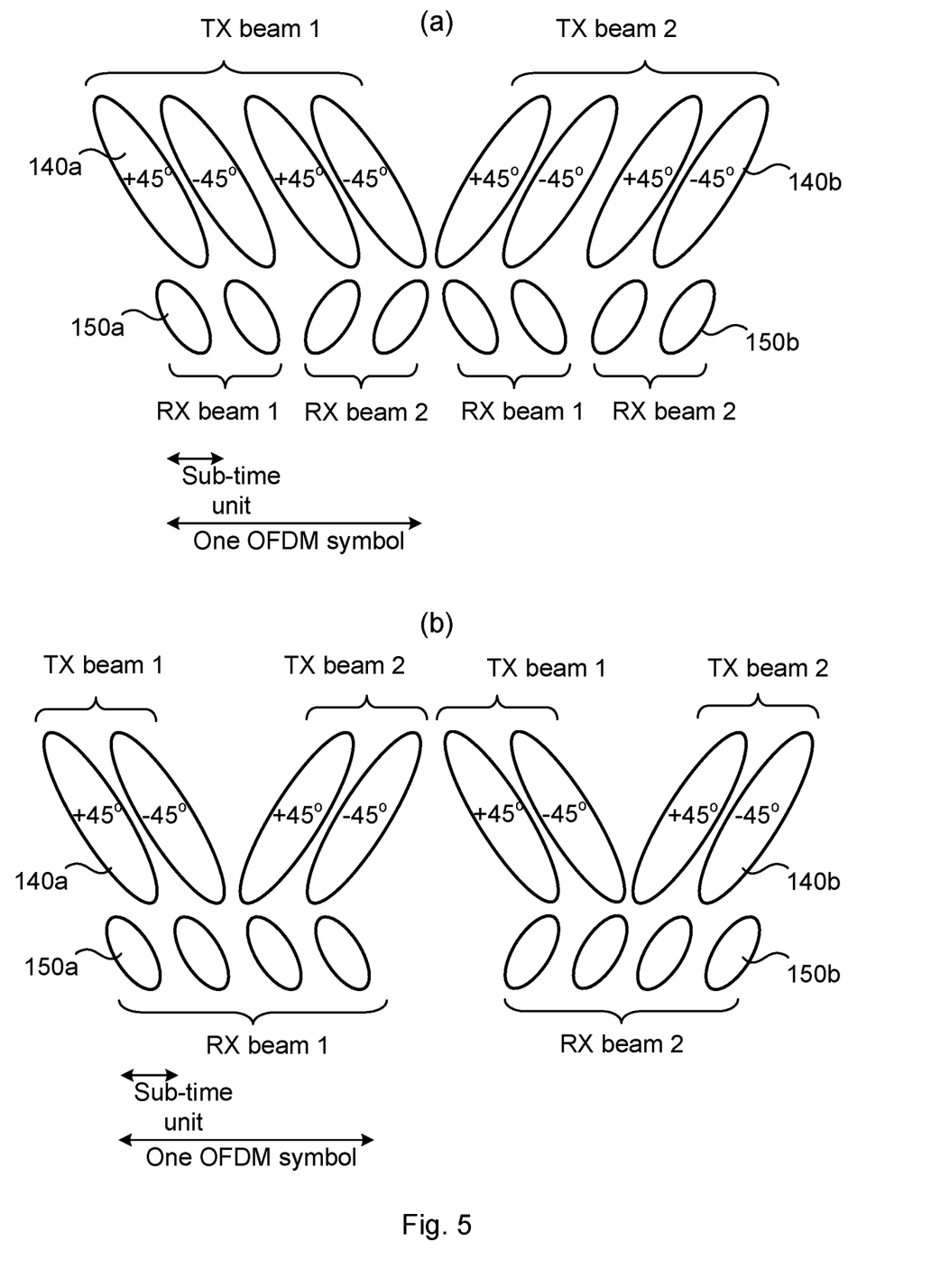
FIG. 5 is a schematic illustration of beam management configurations according to embodiments.

FIG. 5 at (a) and (b) illustrates two examples of beam management configurations, both of which relate to combined transmit beam sweep and receive beam sweep with two directional transmit beams 140a, 140b (denoted TX beam 1 and TX beam 2, respectively) and two directional receive beams 150a, 150b (denoted RX beam 1 and RX beam 2, respectively). The first radio transceiver device 200a is assumed to have directional transmit beams with −45° and +45° linear polarization each. In both examples case, four sub-time units are used per OFDM symbol.

Reference is now made to FIG. 5 at (a). In the first sub-time unit of the first OFDM symbol, the first radio transceiver device 200a transmits with directional transmit beam 140a and +45° polarization. In the second sub-time unit, the first radio transceiver device 200a transmits with directional transmit beam 140a again but with −45° polarization. In these two sub-time units the second radio transceiver device 200b uses the same directional receive beam 150a in order to measure the reference signal on both polarizations. The second radio transceiver device 200b can then aggregate the received power for the occurrences of the reference signal transmitted for both the two polarizations to form a compound RSRP value over both polarizations for the directional transmit beam 140a and report this to the first radio transceiver device 200a. In the next two sub-time units of the first OFDM symbol the first radio transceiver device 200a repeats the transmission of the reference signal for both polarizations in directional transmit beam 140a so that the second radio transceiver device 200b can perform the corresponding measurement for its second directional receive beam 150b.

In the next OFDM symbol, the same procedure is repeated but for directional transmit beam 140a. After these two OFDM symbols, the combined transmit beam sweep and receive beam sweep is complete and the radio transceiver devices 200a, 200b can determine which respective beams to use for data and/or control signal transmission. The example illustrated in FIG. 5 at (a) is summarized in Table 1 (where "pol." is short for polarization).

TABLE 1

Example of receive beam sweep within one single OFDM symbol combined with a transmit beam sweep over two OFDM symbols

| Sub-time unit | 1 | 2 | 3 | 4 | 1 | 2 | 3 | 4 |
|---|---|---|---|---|---|---|---|---|
| TX beam | 1 | 1 | 1 | 1 | 2 | 2 | 2 | 2 |
| TX pol. | +45° | −45° | +45° | −45° | +45° | −45° | +45° | −45° |
| RX beam | 1 | 1 | 2 | 2 | 1 | 1 | 2 | 2 |

The polarization switching can be performed in different orders. For example, the first radio transceiver device 200a can first repeat directional transmit beam 140a using +45° polarization in the first two sub-time units and −45° in the third and fourth sub-time units. The second radio transceiver device 200b needs then to adapt its switches between its directional receive beams 150a, 150b for each beam measures on both polarizations for each directional transmit beam.

Further, the beam switching can be performed in different orders. In the example of FIG. 5 at (b), the first radio transceiver device 200a in the first sub-time unit of the first OFDM symbol transmits the reference signal in directional transmit beam 140a with +45° linear polarization, in the second sub-time unit in directional transmit beam 140a with −45° linear polarization, in the third sub-time unit in directional transmit beam 140b with +45° linear polarization, and in the third sub-time unit in directional transmit beam 140b with −45° linear polarization. The same configuration is then used in the second OFDM symbol. This enables the second radio transceiver device 200b to, in all sub-time units of the first OFDM symbol receive the reference signal in the same directional receive beam 150a and for all sub-time units of the second OFDM symbol receive the reference signal in the same directional receive beam 150b. The example illustrated in FIG. 5 at (b) is summarized in Table 2.

TABLE 2

Example of transmit beam sweep within one single OFDM symbol combined with a receive beam sweep over two OFDM symbols

| Sub-time unit | 1 | 2 | 3 | 4 | 1 | 2 | 3 | 4 |
|---|---|---|---|---|---|---|---|---|
| TX beam | 1 | 1 | 2 | 2 | 1 | 1 | 2 | 2 |
| TX pol. | +45° | −45° | +45° | −45° | +45° | −45° | +45° | −45° |
| RX beam | 1 | 1 | 1 | 1 | 2 | 2 | 2 | 2 |

A third example is illustrated in Table 3. According to the example of Table 3 there are eight sub-time units within one single OFDM symbol, and a combined transmit beam sweep and receive beam sweep is performed within this one single OFDM symbol.

TABLE 3

Example of combined transmit beam sweep and receive beam sweep within one single OFDM symbol

| Sub-time unit | 1 | 2 | 3 | 4 | 5 | 6 | 7 | 8 |
|---|---|---|---|---|---|---|---|---|
| TX beam | 1 | 1 | 1 | 1 | 2 | 2 | 2 | 2 |
| TX pol. | +45° | −45° | +45° | −45° | +45° | −45° | +45° | −45° |
| RX beam | 1 | 1 | 2 | 2 | 1 | 1 | 2 | 2 |

Figure 6:
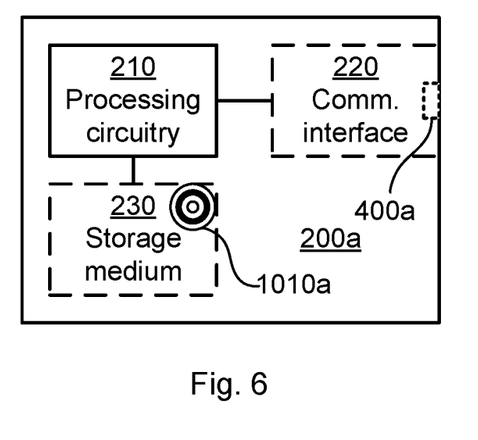
FIG. 6 is a schematic diagram showing functional units of a first radio transceiver device according to an embodiment.

FIG. 6 schematically illustrates, in terms of a number of functional units, the components of the first radio transceiver device 200a according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1010a (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause the first radio transceiver device 200a to perform a set of operations, or steps, S102-S104, as disclosed above. For example, the storage medium 230 may store the set of operations, and the processing circuitry 210 may be configured to retrieve the set of operations from the storage medium 230 to cause the first radio transceiver device 200a to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The first radio transceiver device 200a may further comprise a communications interface 220 at least configured for communications with the second radio transceiver device 200b. As such the communications interface 220 may comprise one or more transmitters and receivers, comprising analogue and digital components.

Signals, such as reference signals as well as data and control signals, could be transmitted from, and received by, a TRP 400a of the first radio transceiver device 200a. The TRP 400a could form an integral part of radio transceiver device 200a or be physically separated from the first radio transceiver device 200a. The communications interface 220 might thus optionally comprise the TRP 400a.

The processing circuitry 210 controls the general operation of the first radio transceiver device 200a e.g. by sending data and control signals to the communications interface 220 and the storage medium 230, by receiving data and reports from the communications interface 220, and by retrieving data and instructions from the storage medium 230. Other components, as well as the related functionality, of the first radio transceiver device 200a are omitted in order not to obscure the concepts presented herein.

Figure 7:
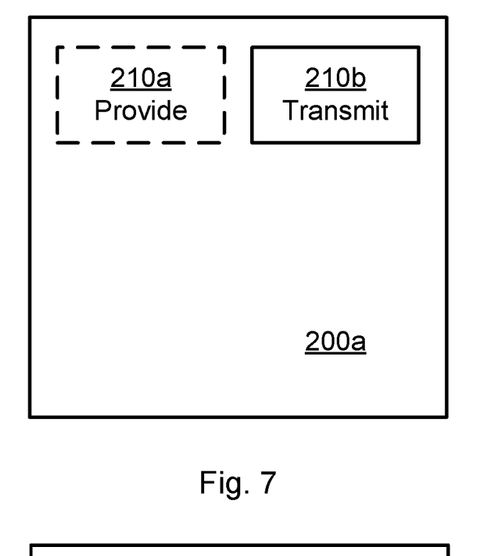
FIG. 7 is a schematic diagram showing functional modules of a first radio transceiver device according to an embodiment.

FIG. 7 schematically illustrates, in terms of a number of functional modules, the components of the first radio transceiver device 200a according to an embodiment. The first radio transceiver device 200a of FIG. 7 comprises a transmit module 210b configured to perform step S104. The first radio transceiver device 200a of FIG. 7 may further comprise a number of optional functional modules, such as a provide module 210a configured to perform step S102. In general terms, each functional module 210a-210b may be implemented in hardware or in software. Preferably, one or more or all functional modules 210a-210b may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210b and to execute these instructions, thereby performing any steps of the first radio transceiver device 200a as disclosed herein.

Figure 8:
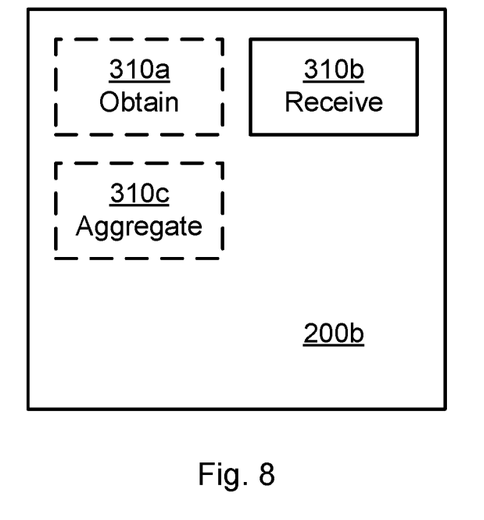
FIG. 8 is a schematic diagram showing functional units of a second radio transceiver device according to an embodiment.

FIG. 8 schematically illustrates, in terms of a number of functional units, the components of a second radio transceiver device 200b according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1010b (as in FIG. 10), e.g. in the form of a storage medium 330. The processing circuitry 310 may further be provided as at least one application specific integrated circuit (ASIC), or field programmable gate array (FPGA).

Particularly, the processing circuitry 310 is configured to cause the second radio transceiver device 200b to perform a set of operations, or steps, S202-S206, as disclosed above. For example, the storage medium 330 may store the set of operations, and the processing circuitry 310 may be configured to retrieve the set of operations from the storage medium 330 to cause the second radio transceiver device 200b to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The second radio transceiver device 200b may further comprise a communications interface 320 at least configured for communications with the first radio transceiver device 200a. As such the communications interface 320 may comprise one or more transmitters and receivers, comprising analogue and digital components.

Signals, such as reference signals as well as data and control signals, could be transmitted from, and received by, a TRP 400b of the second radio transceiver device 200v. The TRP 400b could form an integral part of the second radio transceiver device 200b or be physically separated from the second radio transceiver device 200b. The communications interface 220 might thus optionally comprise the TRP 400b.

The processing circuitry 310 controls the general operation of the second radio transceiver device 200b e.g. by sending data and control signals to the communications interface 320 and the storage medium 330, by receiving data and reports from the communications interface 320, and by retrieving data and instructions from the storage medium 330. Other components, as well as the related functionality, of the second radio transceiver device 200b are omitted in order not to obscure the concepts presented herein.

Figure 9:
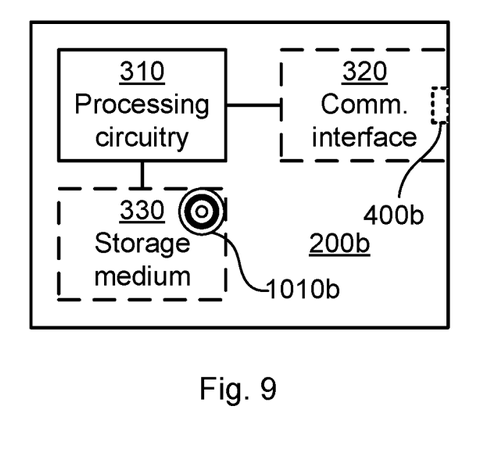
FIG. 9 is a schematic diagram showing functional modules of a second radio transceiver device according to an embodiment.

FIG. 9 schematically illustrates, in terms of a number of functional modules, the components of a second radio transceiver device 200b according to an embodiment. The second radio transceiver device 200b of FIG. 9 comprises a receive module 310b configured to perform step S204. The second radio transceiver device 200b of FIG. 9 may further comprise a number of optional functional modules, such as any of an obtain module 310a configured to perform step S202, and an aggregate module 310c configured to perform step S206. In general terms, each functional module 310a-310c may be implemented in hardware or in software. Preferably, one or more or all functional modules 310a-310c may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310c and to execute these instructions, thereby performing any steps of the second radio transceiver device 200b as disclosed herein.

The first radio transceiver device 200a and the second radio transceiver device 200b may be provided as respective standalone devices or as a part of respective further devices. Examples of devices in which the functionality of the first radio transceiver device 200a and the second radio transceiver device 200b might be provided have been given above with reference to FIG. 1.

A first portion of the instructions performed by the first radio transceiver device 200a and/or the second radio transceiver device 200b may be executed in a respective first device, and a second portion of the of the instructions performed by the first radio transceiver device 200a and/or the second radio transceiver device 200b may be executed in a respective second device; the herein disclosed embodiments are not limited to any particular number of devices on which the instructions performed by the first radio transceiver device 200a and/or the second radio transceiver device 200b may be executed. Hence, the methods according to the herein disclosed embodiments are suitable to be performed by a first radio transceiver device 200a and/or second radio transceiver device 200b residing in a cloud computational environment. Therefore, although a single processing circuitry 210, 310 is illustrated in FIGS. 6 and 8 the processing circuitry 210, 310 may be distributed among a plurality of devices, or nodes. The same applies to the functional modules 210a-210b, 310a-310c of FIGS. 7 and 9 and the computer programs 1020a, 1020b of FIG. 10 (see below).

Figure 10:
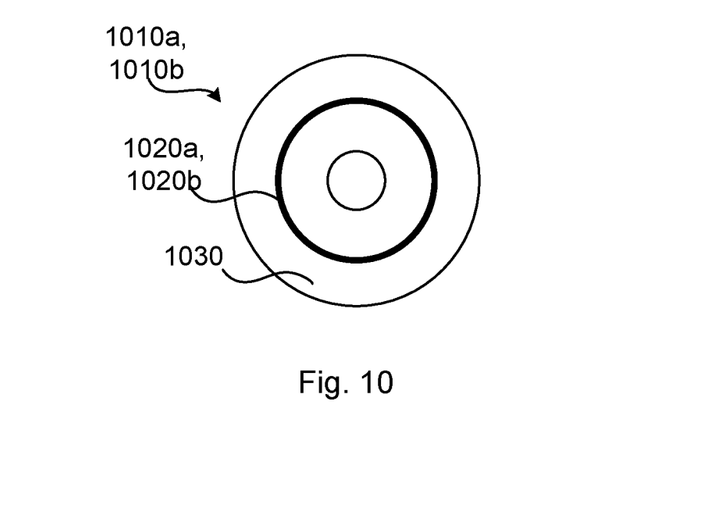
FIG. 10 shows one example of a computer program product comprising computer readable means according to an embodiment.

FIG. 10 shows one example of a computer program product 1010a, 1010b comprising computer readable means 1030. On this computer readable means 1030, a computer program 1020a can be stored, which computer program 1020a can cause the processing circuitry 210 and thereto operatively coupled entities and devices, such as the communications interface 220 and the storage medium 230, to execute methods according to embodiments described herein. The computer program 1020a and/or computer program product 1010a may thus provide means for performing any steps of the first radio transceiver device 200a as herein disclosed. On this computer readable means 1030, a computer program 1020b can be stored, which computer program 1020b can cause the processing circuitry 310 and thereto operatively coupled entities and devices, such as the communications interface 320 and the storage medium 330, to execute methods according to embodiments described herein. The computer program 1020b and/or computer program product 1010b may thus provide means for performing any steps of the second radio transceiver device 200b as herein disclosed.

In the example of FIG. 10, the computer program product 1010a, 1010b is illustrated as an optical disc, such as a CD (compact disc) or a DVD (digital versatile disc) or a Blu-Ray disc. The computer program product 1010a, 1010b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020a, 1020b is here schematically shown as a track on the depicted optical disk, the computer program 1020a, 1020b can be stored in any way which is suitable for the computer program product 1010a, 1010b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for a beam management procedure in a communications network, the method being performed by a first radio transceiver device, the method comprising:
transmitting a message indicating a beam management configuration to a second radio transceiver device prior to transmitting a reference signal, the beam management configuration indicating that the first radio transceiver device will transmit two occurrences of the reference signal within a single orthogonal frequency-division multiplexing ("OFDM") symbol and that the OFDM symbol will be transmitted using two polarities within a directional transmit beam; and
transmitting, in the one directional transmit beam, the reference signal to the second radio transceiver device as part of the beam management procedure according to the beam management configuration,
wherein the two occurrences of the reference signal are transmitted within the single OFDM symbol, wherein when performing beam management using sub-time units, polarization of the directional transmit beam is switched between consecutive sub-time units, and how many times the first radio transceiver switches polarization depends on how many directional receive beams the reference signal is to be received in by the second radio transceiver and on how many sub-units the OFDM symbol is divided into, and
wherein one occurrence for each of the two polarizations of the reference signal is transmitted in the directional transmit beam within the single OFDM symbol.

2. The method according to claim 1, wherein the beam management configuration specifies a beam sweep at the first radio transceiver device and no beam sweep at the second radio transceiver device.

3. The method according to claim 2, wherein, within the single OFDM symbol, one occurrence of the reference signal is transmitted in at least two directional transmit beams.

4. The method according to claim 3, wherein each of the at least two directional transmit beams are transmitted in two polarizations within the single OFDM symbol.

5. The method according to claim 1, wherein the beam management configuration specifies no beam sweep at the first radio transceiver device and a beam sweep at the second radio transceiver device.

6. The method according to claim 5, wherein, within the single OFDM symbol, at least two occurrences of the reference signal are transmitted in each of two polarizations in the directional transmit beam.

7. The method according to claim 1, wherein the beam management configuration specifies a beam sweep at the first radio transceiver device and a beam sweep at the second radio transceiver device.

8. The method according to claim 7, wherein, within the single OFDM symbol, at least two occurrences of the reference signal are transmitted, wherein each of the at least two occurrences is transmitted in its own directional transmit beam.

9. The method according to claim 1, wherein the first radio transceiver device comprises baseband circuitry, and wherein polarization is switched by changing antenna port at the baseband circuitry.

10. The method according to claim 1, wherein the two polarizations are mutually orthogonal.

11. A method for participating in a beam management procedure in a communications network, the method being performed by a second radio transceiver device, the method comprising:
receiving a message indicating a beam management configuration from a first radio transceiver device before receiving a reference signal, the beam management configuration indicating that the first radio transceiver device will transmit two occurrences of the reference signal within a single orthogonal frequency-division multiplexing ("OFDM") symbol and that the OFDM symbol will be transmitted using two polarities within a directional transmit beam; and
receiving, in at least one receive beam, the reference signal from the first radio transceiver device as part of participating in the beam management procedure and according to the beam management configuration,
wherein the reference signal has been transmitted from the first radio transceiver device in the at least one directional transmit beam,
wherein the more than one occurrence of the reference signal is transmitted within the single OFDM symbol, wherein when performing beam management using sub-time units, polarization of the directional transmit beam is switched between consecutive sub-time units, and how many times the first radio transceiver switches polarization depends on how many directional receive beams the reference signal is to be received in by the second radio transceiver and on how many sub-units the OFDM symbol is divided into, and
wherein the one occurrence for each of the two polarizations of the reference signal is transmitted in each of the at least one directional transmit beam within the one OFDM symbol.

12. The method according to claim 11, further comprising: aggregating, for each receive beam, received power for the occurrences of the reference signal transmitted for both the two polarizations in one of the at least one directional transmit beam based on the beam management configuration.

13. The method according to claim 11, wherein the reference signal is received in at least two directional receive beams.

14. The method according to claim 13, wherein one occurrence for each of two polarizations of the reference signal is received in each of the at least two directional receive beams.

15. The method according to claim 13, wherein the at least two directional receive beams are switched within the one single OFDM symbol when the polarization in which the reference signal is transmitted is switched within the one single OFDM symbol.

16. The method according to claim 11, wherein the beam management configuration specifies a beam sweep at the first radio transceiver device and no beam sweep at the second radio transceiver device.

17. The method according to claim 16, wherein, within the single OFDM symbol, one respective occurrence of the reference signal as transmitted in at least two directional transmit beam is received in one and the same receive beam.

18. The method according to claim 17, wherein the reference signal as transmitted in each of the at least two directional transmit beam has two polarizations within the single OFDM symbol.

19. The method according to claim 11, wherein the beam management configuration specifies no beam sweep at the first radio transceiver device and a beam sweep at the second radio transceiver device.

20. The method according to claim 19, wherein, within the single OFDM symbol, at least two occurrences of the reference signal are transmitted in each of two polarizations in one and the same directional transmit beam, and
wherein the reference signal of both the two polarizations is received in each of at least two directional receive beams.

21. The method according to claim 11, wherein the beam management configuration specifies a beam sweep at the first radio transceiver device and a beam sweep at the second radio transceiver device.

22. The method according to claim 21, wherein, within the single OFDM symbol, at least two occurrences of the reference signal are transmitted, and
wherein each of the at least two occurrences is transmitted in its own directional transmit beam and/or is received in each of at least two directional receive beams.

23. A first radio transceiver device for a beam management procedure in a communications network, the first radio transceiver device comprising processing circuitry, the processing circuitry being configured to cause the first radio transceiver device to:
transmit a message indicating a beam management configuration to a second radio transceiver device prior to transmitting a reference signal, the beam management configuration indicating that the first radio transceiver device will transmit two occurrences of the reference signal within a single orthogonal frequency-division multiplexing ("OFDM") symbol and that the OFDM symbol will be transmitted using two polarizations within a directional transmit beam; and
transmit, in the directional transmit beam, the reference signal to the second radio transceiver device as part of the beam management procedure according to the beam management configuration,
wherein the two occurrences of the reference signal is transmitted within the single OFDM symbol, wherein when performing beam management using sub-time units, polarization of the directional transmit beam is switched between consecutive sub-time units and how many times the first radio transceiver switches polarization depends on how many directional receive beams the reference signal is to be received in by the second radio transceiver and on how many sub-units the OFDM symbol is divided into, and
wherein one occurrence for each of the two polarizations of the reference signal is transmitted in the directional transmit beam within the single OFDM symbol.

24. A second radio transceiver device for participating in a beam management procedure in a communications network, the second radio transceiver device comprising processing circuitry, the processing circuitry being configured to cause the second radio transceiver device to:
receive a message indicating a beam management configuration from a first radio transceiver device before receiving a reference signal, the beam management configuration indicating that the first radio transceiver device will transmit two occurrences of the reference signal within a single orthogonal frequency-division multiplexing ("OFDM") symbol, wherein the OFDM symbol will be transmitted using two polarities within a directional transmit beam; and
receive, in at least one receive beam, the reference signal from the first radio transceiver device as part of participating in the beam management procedure and according to the beam management configuration,
wherein the reference signal has been transmitted from the first radio transceiver device in the at least one directional transmit beam,
wherein the more than one occurrence of the reference signal is transmitted within the single OFDM symbol, wherein when performing beam management using sub-time units, polarization of the directional transmit beam is switched between consecutive sub-time units, and how many times the first radio transceiver switches polarization depends on how many directional receive beams the reference signal is to be received in by the second radio transceiver and on how many sub-units the OFDM symbol is divided into, and
wherein the one occurrence for each of the two polarizations of the reference signal is transmitted in each of the at least one directional transmit beam within the single OFDM symbol.

* * * * *